No. 688,363. Patented Dec. 10, 1901.
E. A. TAYLOR.
MACHINE FOR MIXING PLASTER OF PARIS.
(Application filed Dec. 17, 1900.)
(No Model.) 2 Sheets—Sheet 2.

Witnesses:
J. M. Fowler Jr.
W. Darrell.

Inventor:
Edgar A. Taylor
by Patrick H. O'Farrell
Atty

UNITED STATES PATENT OFFICE.

EDGAR A. TAYLOR, OF GRISWOLD, IOWA.

MACHINE FOR MIXING PLASTER-OF-PARIS.

SPECIFICATION forming part of Letters Patent No. 688,363, dated December 10, 1901.

Application filed December 17, 1900. Serial No. 40,198. (No model.)

*To all whom it may concern:*

Be it known that I, EDGAR A. TAYLOR, a citizen of the United States of America, residing at Griswold, in the county of Cass and State of Iowa, have invented certain new and useful Improvements in Machines for Mixing Plaster-of-Paris, of which the following is a specification.

This invention relates to machines for mixing plaster-of-paris, and is more particularly designed for mixing plaster for dental purposes.

The object of this invention is to provide a machine that will feed, sieve, and mix the plaster-of-paris automatically.

Another object of this invention is to so construct the machine that it may be easily and quickly taken apart or put together, the arrangement being simple, inexpensive, unique, and durable and one adapted to efficiently perform all of its intended functions.

With these objects in view and such others as may hereinafter appear my invention consists in the particular construction of the various parts and in the novel manner of combination and arrangement of the said parts, all of which will be described hereinafter and fully pointed out in the claims.

Figure 1:
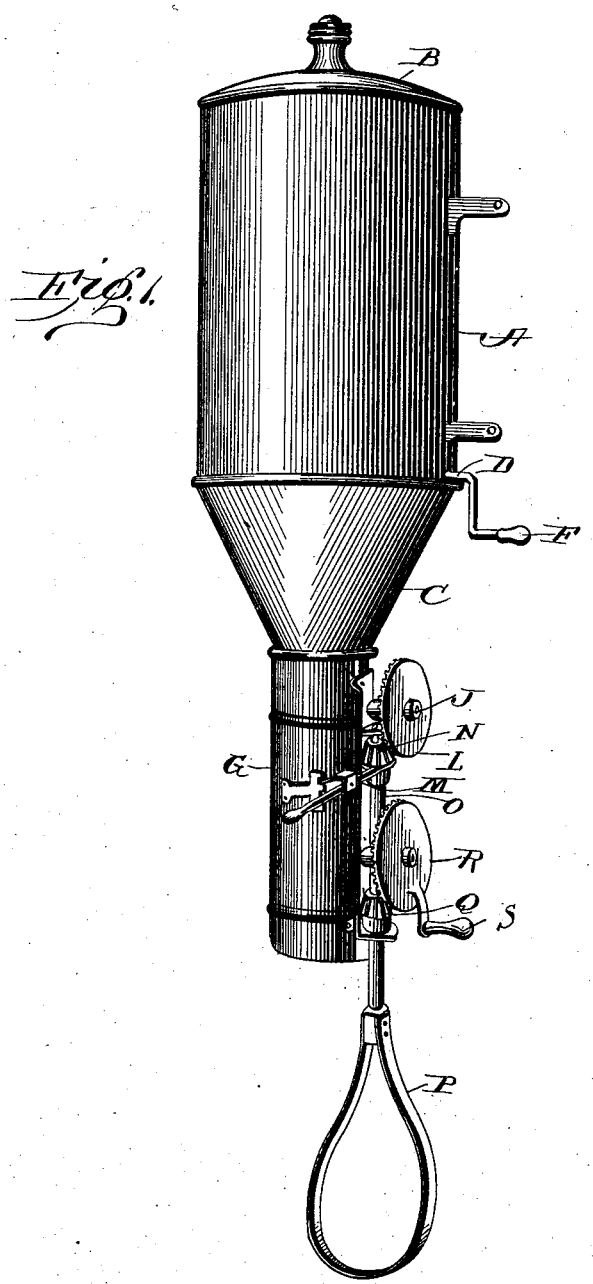
Figure 2:
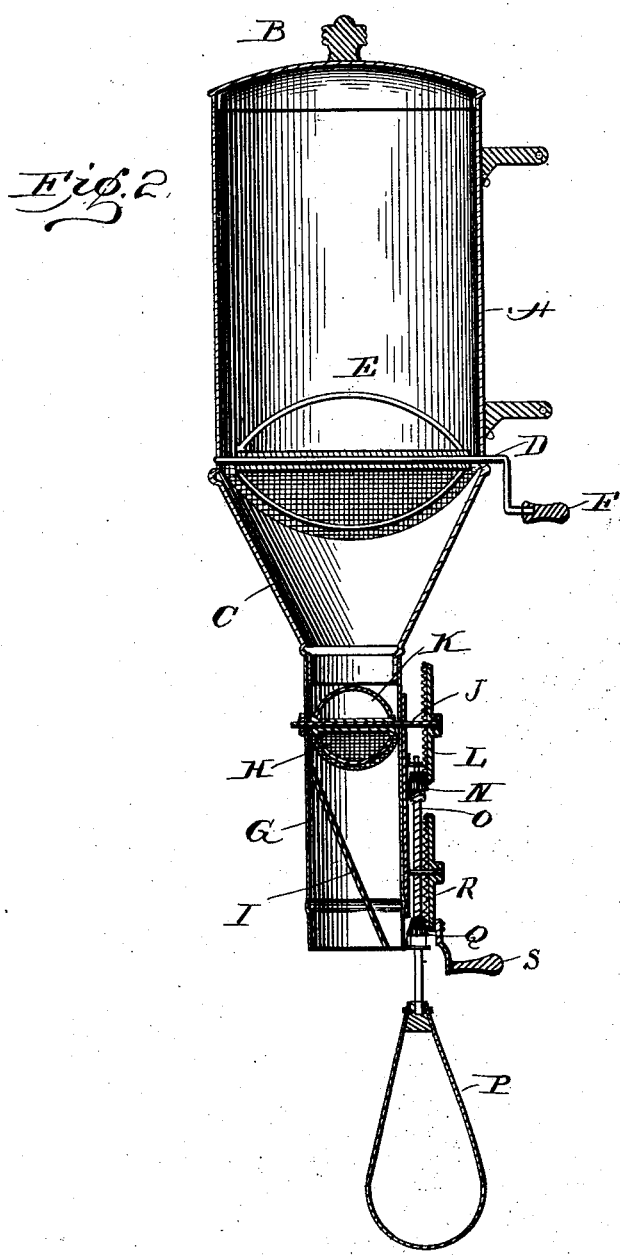

In the drawings forming a part of this specification, Figure 1 is a perspective view of my invention. Fig. 2 is a vertical sectional view.

Referring by letters to the drawings, A represents the hopper, which consists of a cylindrical receptacle having a cover or top B and a funnel-shaped bottom C. This receptacle is adapted to be secured to the wall or workbench in a vertical position and is provided with a shaft D, journaled in a horizontal position just above the funnel-shaped bottom. The shaft is provided with a semicircular wire frame E and adapted to be operated by a crank and handle F, the object of which will be hereinafter explained. Detachably secured to the funnel-shaped portion of the receptacle is a cylindrical section G, secured in the upper end of which is a semicircular sieve H and a deflector I, which is secured diagonally within the cylinder. Journaled in the wall of the cylindrical section immediately above the sieve is a shaft J, provided with a semicircular wire frame K, which rotates in the semicircular sieve and is driven by a pinion L, mounted upon end of the shaft J, which pinion is adapted to be thrown into and out of gear by the lock-lever M. The pinion L engages the pinion N, mounted in the slot upon the upper end of the vertical shaft O, which shaft is mounted upon the walls of the cylindrical section and is provided upon its lower end with a mixing-blade P, consisting of a steel band bent pear-shaped.

The shaft O is provided with a fixed pinion Q, which engages and is driven by a beveled gear-wheel R, provided with a handle S.

It will be readily seen that by placing the plaster-of-paris in the receptacle it may be easily transferred to the sieve by turning the handle F. After a sufficient amount of the material has been transferred to the sieve it may be forced through by pushing the lock-lever down, and thereby connecting or throwing in gear the movable pinion with the pinion mounted upon the shaft carrying the semicircular wire frame which is adapted to rotate in the sieve. The wire frame may be thrown out of gear by pushing the lock-lever up.

The material which passes through the sieve is deflected so as to come from the machine on the side at that portion of the wall nearest the mixing-blade. The mixing-blade is secured to the end of a vertical shaft which is provided with a movable pinion herein referred to and a fixed or immovable pinion which engages and is driven by a beveled gear-wheel having a handle thereon.

Having thus described my invention, what I claim as new and useful, and desire to secure by Letters Patent, is—

1. In a machine of the character described, the combination with a hopper; of a cylindrical section thereto, a sieve therein, a revoluble frame in the sieve, a shaft thereto, a vertical shaft upon the wall of the cylindrical section, a mixing-blade extending therefrom and means for imparting motion to the shaft of the frame from the mixer-shaft.

2. In a machine for mixing plaster-of-paris, the combination with a hopper; of a cylindrical section, a vertical shaft mounted upon the wall thereof, a mixer-blade extending from the shaft, a fixed pinion upon said shaft, a pinion feathered upon the shaft, a beveled gear-wheel engaging the fixed pinion, a lever for shifting the movable or feathered pinion, a beveled gear-wheel adapted to engage the slidable pinion, a shaft to said wheel, a semicircular frame upon said shaft, a concavo-convex sieve secured in the cylindrical section, said frame being adapted to revolve therein, and a deflector in said section.

3. In a machine for mixing plaster-of-paris, the combination with a hopper; of a detachable cylindrical section secured to said hopper, a vertical shaft journaled upon the wall of the section, a mixing-blade upon the shaft, an immovable and a movable pinion, a beveled gear-wheel engaging the immovable pinion, a lever for shifting the movable pinion, a beveled gear-wheel adapted to engage the movable pinion, a shaft to said wheel, a frame thereupon, a concavo-convex sieve secured within the cylindrical section, and a deflector in said section, said frame being revoluble in the sieve.

EDGAR A. TAYLOR.

Witnesses:
A. G. ARRASMITH,
T. H. GRENNELL.